(12) United States Patent
Moravy

(10) Patent No.: US 8,561,768 B2
(45) Date of Patent: Oct. 22, 2013

(54) VEHICLE DAMPER AND METHOD

(75) Inventor: Lars David Moravy, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 982 days.

(21) Appl. No.: 11/848,941

(22) Filed: Aug. 31, 2007

(65) Prior Publication Data

US 2009/0057081 A1  Mar. 5, 2009

(51) Int. Cl.
*F16F 9/36* (2006.01)

(52) U.S. Cl.
USPC ............... 188/322.16; 92/165 R; 92/168

(58) Field of Classification Search
USPC ............ 188/322.16–322.17; 92/165 R, 168
See application file for complete search history.

(56) References Cited

U.S. PATENT DOCUMENTS

| | | | | |
|---|---|---|---|---|
| 2,349,170 A | * | 5/1944 | Jackman | 277/488 |
| 2,492,006 A | * | 12/1949 | Raybould | 92/168 |
| 4,428,566 A | | 1/1984 | de Baan et al. | |
| 4,438,834 A | | 3/1984 | Handke et al. | |
| 4,682,732 A | * | 7/1987 | Walto | 239/123 |
| 4,880,087 A | | 11/1989 | Janes | |
| 4,989,701 A | | 2/1991 | Yamaoka et al. | |
| 5,224,573 A | | 7/1993 | Amemiya et al. | |
| 5,584,368 A | | 12/1996 | Larsson | |
| 5,715,740 A | * | 2/1998 | Sims | 92/128 |
| 6,003,848 A | | 12/1999 | Cotter et al. | |
| 6,105,739 A | | 8/2000 | Deppert | |
| 6,318,526 B1 | | 11/2001 | Kruckemeyer et al. | |
| 6,325,187 B1 | | 12/2001 | Boucher | |
| 6,640,943 B1 | | 11/2003 | Daws et al. | |
| 6,749,048 B2 | | 6/2004 | Coombs | |
| 6,749,185 B1 | | 6/2004 | Reilly et al. | |
| 6,820,729 B2 | | 11/2004 | Verriet | |
| 6,862,884 B2 | * | 3/2005 | Cohen et al. | 60/589 |
| 6,883,649 B2 | * | 4/2005 | Lun | 188/267.2 |
| 7,004,293 B2 | * | 2/2006 | Schurmans | 188/322.17 |
| 7,621,382 B2 | * | 11/2009 | Zdeb | 188/315 |
| 2003/0070893 A1 | | 4/2003 | Adrian et al. | |
| 2004/0182661 A1 | | 9/2004 | Lun | |
| 2004/0206590 A1 | * | 10/2004 | Harbu et al. | 188/322.16 |

FOREIGN PATENT DOCUMENTS

GB  2205382 A  * 12/1988

* cited by examiner

*Primary Examiner* — Anna Momper

(74) *Attorney, Agent, or Firm* — Kenealy Vaidya LLP; Mark E. Duell

(57) ABSTRACT

A damper for use in vehicle and automotive applications can include a structure for sealing a top portion of the damper such that standing water is prevented from residing adjacent the cylinder/tube, piston rod, gaskets, o-rings, grommets, or other structures located at a top portion of the damper. The structure for sealing the top portion of the damper can include a seal that is located between a rod guide and the damper tube such that water and debris are kept from entering an inner portion of the damper mechanism.

21 Claims, 4 Drawing Sheets

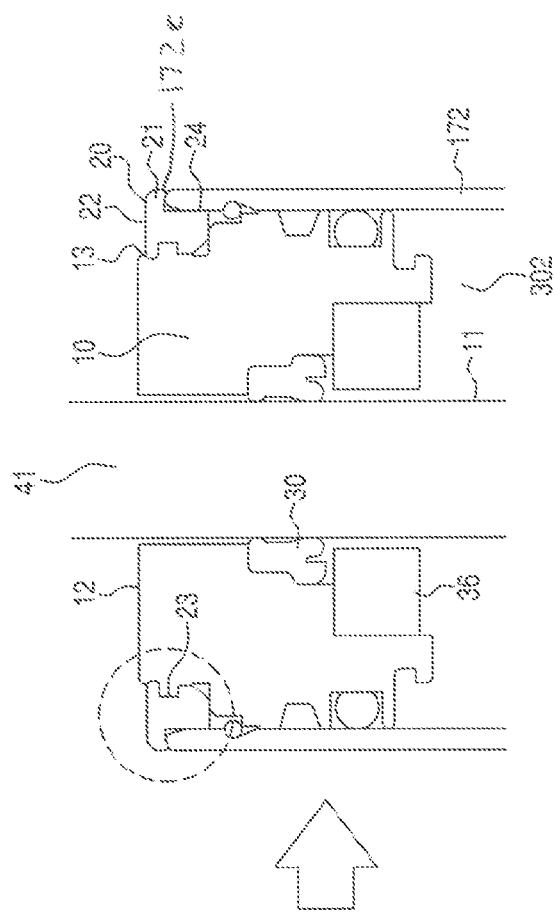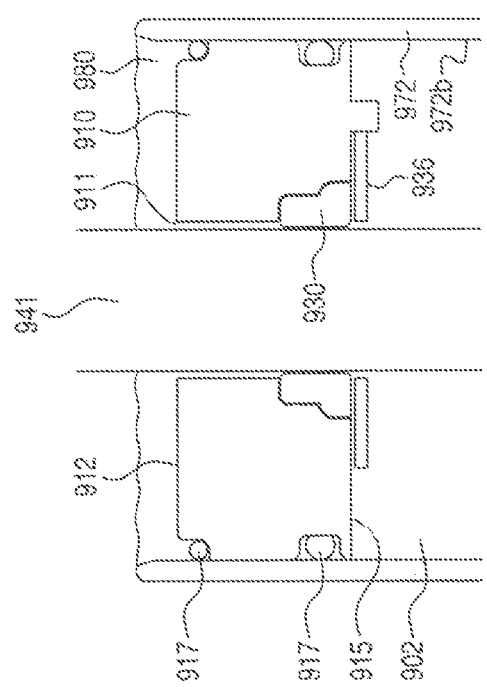

VEHICLE DAMPER AND METHOD

BACKGROUND

1. Field

The disclosed subject matter relates to a vehicle damper and a method of manufacturing the same. More specifically, the disclosed subject matter relates to a rod guide and sealing structure for a vehicle damper and the sealing method therefore.

2. Brief Description of the Related Art

Vehicle dampers are used in conjunction with vehicle suspension systems to absorb unwanted vibrations which occur during operation of the vehicle. In order to absorb this unwanted vibration, vehicle dampers are connected between the sprung mass (the body) and the unsprung mass (the suspension system) of the vehicle. A piston is located within a pressure tube of the vehicle damper and is connected to either the sprung mass or possibly the unsprung mass of the vehicle. The pressure tube is connected to the other of the unsprung mass or sprung mass of the vehicle and is filled with hydraulic fluid. Because the piston has the capability of limiting the flow of hydraulic fluid within the pressure tube when the vehicle damper is compressed or extended, the vehicle damper is able to produce a damping force which counteracts the vibrations which would otherwise be transmitted from the suspension (unsprung mass) to the body (sprung mass) of the vehicle.

A conventional dual tube vehicle damper includes a pressure tube with a piston disposed therein and a reserve tube surrounding the pressure tube. A piston rod is connected to the piston and extends through the upper end of the pressure and reserve tubes. At the lower end of the pressure tube, a base valve is located between the pressure tube and the reserve tube. The base valve controls fluid flow between the working chamber defined by the pressure tube and the reserve chamber defined by the reserve tube. The damping force is created by restricting the flow of fluid through passages in the piston and valve plates which regulate passage of fluid between opposite sides of the piston within the working chamber.

Because the piston rod is located on only one side of the piston, a different amount of fluid is displaced on the compression stroke as opposed to the rebound stroke. The difference in the amount of fluid is termed the rod volume. The rod volume of fluid is pushed out of the pressure tube, through the base valve and into the reserve tube during a compression stroke. During a rebound stroke, the rod volume of fluid flows in the opposite direction from the reserve tube, through the base valve and into the pressure tube.

The piston rod is supported at its lower end by the piston and is slidingly received at the upper end of the vehicle damper by a rod guide. The rod guide thus functions as a slide bearing for the rod. The rod guide properly positions the piston rod within the pressure tube and also acts as a closure member for both the pressure tube and the reserve tube. A small clearance can be formed between the inner periphery of the bearing portion of the rod guide and the outer periphery of the piston rod in order to provide smooth sliding of the piston rod through the rod guide. The small clearance also allows for the hydraulic fluid to lubricate the interface between the piston rod and the rod guide.

In addition to locating the piston rod and closing the pressure and reserve tubes, the rod guide supports and locates a seal assembly which is designed to keep the hydraulic fluid within the vehicle damper and also keep contaminants out of the vehicle damper. The seal assembly normally interfaces between the reserve tube and the rod guide, between the rod guide and the piston rod and possibly between the reserve tube and the piston rod. The seal assembly is designed to keep hydraulic fluid within the vehicle damper as well as keep dirt and other contaminates from entering the vehicle damper. The dirt and contaminants can be present and can adhere to the exposed portion of the piston rod.

There have been numerous seal systems designed and developed for meeting the difficult environmental and sealing requirements for vehicle dampers. While these conventional art seal systems are adequate for their intended purpose, the continued development of vehicle dampers and related seal systems has been directed towards dampers that are made of different materials and have different constructions, requiring different types of seals and seal systems.

One type of vehicle damper and seal system that is currently under continuous development is a monotube type damper. In a monotube type damper, a second reserve tube is not necessary. Instead, a second "floating piston" is provided within the first tube and is located below the working piston. The floating piston divides a working chamber of the monotube that is filled with hydraulic fluid from a lower chamber that can be filled with gas or other easily expandable/contractible fluid. The working piston is connected to a piston rod and moves with respect to the monotube structure by passing through a sealing structure/system located at an upper end of the working chamber above the working piston, similar to the system described above with respect to a dual chamber damper.

A typical monotube damper seal system is shown in FIG. 2A in which a seal system includes an aluminum rod guide 910 connected to an end of a single steel tube 972. The outer portion of the rod guide 910 is sealed with a surface of the inner tube wall 972*b* by O-rings 917 that prevent hydraulic fluid 902 from escaping. Likewise, the inner through hole 911 of the rod guide is sealed at the juncture between the rod guide 910 and the piston rod 941 by a lower inner seal 930. A lock ring 936 is press fit into an opening in the lower surface 915 of the rod guide 910 to lock the lower inner seal 930 to the rod guide 910. The rod guide 910 can be locked with respect to the tube 972 via a clinch ring indent in the tube 972 that corresponds to an indent in the rod guide 910.

The top surface 912 of the rod guide 910 is surrounded by a wall of the bordering tube 972 that extends beyond the rod guide 910 and forms a cup with the top surface 912 of the rod guide. This "cup" shaped portion tends to trap water 980 and other dirt and debris 981 at the top of the rod guide 910.

As shown in FIG. 3, the water 980 and debris 981 that are trapped by the tube wall 972 and rod guide 910 at the top of the damper 900 can result in a break down of the seal system between the rod guide 910 and either the tube 972 or the piston rod 941. The break down occurs when the water 980 and/or debris 981 get in between either the piston rod 941 and rod guide 910 or the rod guide 910 and inner surface 972*b* of the tube 972. The water 980 and/or debris 981 cause the O-ring(s) 917 and/or lower inner seal 930 to deteriorate, resulting in water, debris or hydraulic fluid either entering into the working piston chamber or escaping from the working piston chamber. Over time, this defect can cause deterioration of performance in the damper 900 and possibly failure of the damper 900.

In some monotube dampers the rod guide 910 is made from aluminum (that can be anodized) while the tube 972 is made from steel (which can be galvanized). Thus, at the juncture between these two structures, galvanic corrosion can also occur, which can cause poor performance or failure of the damper sealing system. For example, galvanic corrosion between the rod guide and the piston rod or between rod guide and the damper tube can result in free play and relative movement between the parts, causing unwanted noise and further deterioration and loss of structural integrity for the damper 900.

Thus, there has been a long felt need to improve the sealing system in monotube and other types of dampers, to avoid corrosion and deterioration of the seal system, to improve or broaden the tolerance requirements for the parts that make up dampers, and to improve the overall performance and manufacturability of dampers in general.

SUMMARY

The disclosed subject matter relates to a vehicle damper and a method of manufacturing a damper. The vehicle damper can be configured as a suspension damper, and alternatively can be configured as an air spring for the trunk or hood of a vehicle, etc.

In accordance with an aspect of the disclosed subject matter, a vehicle damper is disclosed that can include a damper tube having a first portion and a second portion located along a longitudinal axis of the damper tube. A piston can be located in the damper tube. A piston rod can be attached to the piston at the first portion of the damper tube and can extend from the first portion of the damper tube to the second portion of the damper tube along the longitudinal axis of the damper tube. A rod guide can be located adjacent the piston rod and the second portion of the damper tube and made from a hard material. A working volume can be located between the rod guide and piston and defined by the damper tube. An outer seal can be located between the rod guide and the damper tube and made from a relatively softer material than the rod guide. The outer seal can include an outer seal top surface that faces away from the working volume. The rod guide can include a rod guide top surface that faces away from the working volume. The damper tube can include a damper tube top surface that faces away from the working volume. The working volume can be located at a first longitudinal axis position with respect to a longitudinal axis direction, the rod guide top surface can be located at a second longitudinal axis position with respect to the longitudinal axis direction, the outer seal top surface can be located at a third longitudinal axis position with respect to the longitudinal axis direction, and the damper tube top surface can be located at a fourth longitudinal axis position with respect to the longitudinal axis direction. The second longitudinal axis position of the rod guide top surface can be spaced from the first longitudinal axis position of the working chamber at a second rod guide longitudinal axis distance, the third longitudinal axis position of the outer seal top surface can be spaced from the first longitudinal axis position of the working chamber at a third outer seal longitudinal axis distance, the fourth longitudinal axis position of the damper tube top surface can be spaced from the first longitudinal axis position of the working chamber at a fourth tube top longitudinal axis distance. The fourth tube top longitudinal axis distance can be less than or substantially equal to the second rod guide longitudinal axis distance.

In accordance with another aspect of the disclosed subject matter, the third outer seal longitudinal axis distance can be less than or substantially equal to the second rod guide longitudinal axis distance.

In accordance with yet another aspect of the disclosed subject matter, the rod guide top surface, the outer seal top surface, and the top surface of the tube can be configured to cause liquid to continuously move away from the rod guide and towards the damper tube when the damper is in use.

In accordance with still another aspect of the disclosed subject matter, the rod guide can be made from an aluminum type material and the damper tube is made from a steel type material.

In accordance with another aspect of the disclosed subject matter, the outer seal can include an overhang portion that extends beyond an inner surface of the damper tube in a direction substantially perpendicular to the longitudinal axis of the damper tube.

In accordance with an aspect of the disclosed subject matter, the outer seal top surface can be substantially flush with the rod guide top surface.

In accordance with still another aspect of the disclosed subject matter, the rod guide can be located at an upper portion of the damper and the piston can be located at a lower portion of the damper, and an imaginary line that extends perpendicular to the piston rod and is in contact with an uppermost portion of the rod guide top surface does not intersect the damper tube.

In accordance with another aspect of the disclosed subject matter, the rod guide can be located at an upper portion of the damper and the piston can be located at a lower portion of the damper, and an imaginary line that extends perpendicular to the piston rod and is in contact with an uppermost portion of the outer seal top surface does not intersect the damper tube.

In accordance with yet another aspect of the disclosed subject matter, the damper can be a monotube damper.

In accordance with an aspect of the disclosed subject matter, the damper can be configured as an active (e.g., magnetorheological) damper or a traditional semi-active or non-active damper.

In accordance with another aspect of the disclosed subject matter, a vehicle damper can include a piston rod having a longitudinal axis extending between an upper portion of the piston rod and a lower portion of the piston rod, a piston attached to the lower portion of the piston rod, a rod guide located adjacent the upper portion of the piston rod and having a top surface located at an uppermost portion of the rod guide, the rod guide made from an aluminum type material, a damper tube located adjacent the piston rod and extending from the upper portion to the lower portion of the piston rod, the damper tube having a top surface at an uppermost portion of the damper tube, and the top surface of the damper tube located substantially co-planar with or lower than the rod guide top surface, an outer seal made of a material that is softer than the material of the rod guide, the outer seal located between the rod guide and the damper tube and including an outer seal top surface at an uppermost portion of the outer seal such that at least the rod guide top surface and the outer seal top surface form an uppermost surface of the damper.

In accordance with still another aspect of the disclosed subject matter, a portion of the uppermost surface of the damper that is furthest away from the piston rod is lower than a portion of the uppermost surface of the damper that is closest to the piston rod.

Still other features and characteristics of the disclosed subject matter will become apparent to those skilled in the art from a reading of the following detailed description of exemplary embodiments constructed in accordance therewith, and taken in conjunction with the accompanying drawings.

BRIEF DESCRIPTION OF THE DRAWINGS

The disclosed subject matter will become clear from the following description with reference to the accompanying drawings, wherein:

FIG. 2A is a cross sectional view of a conventional sealing system for a vehicle damper;

FIG. 2B is a cross sectional view of the sealing system of the vehicle damper shown in FIG. 1;

DETAILED DESCRIPTION OF EXEMPLARY EMBODIMENTS

The disclosed subject matter will now be described in more detail with reference to exemplary embodiments of the vehicle damper and method, given only by way of example, and with reference to the accompanying drawings.

The disclosed subject matter relates to a vehicle damper, and more particularly to a sealing system for a vehicle damper. In addition, the disclosed subject matter relates to sealing systems for monotube type vehicle dampers.

Figure 1:
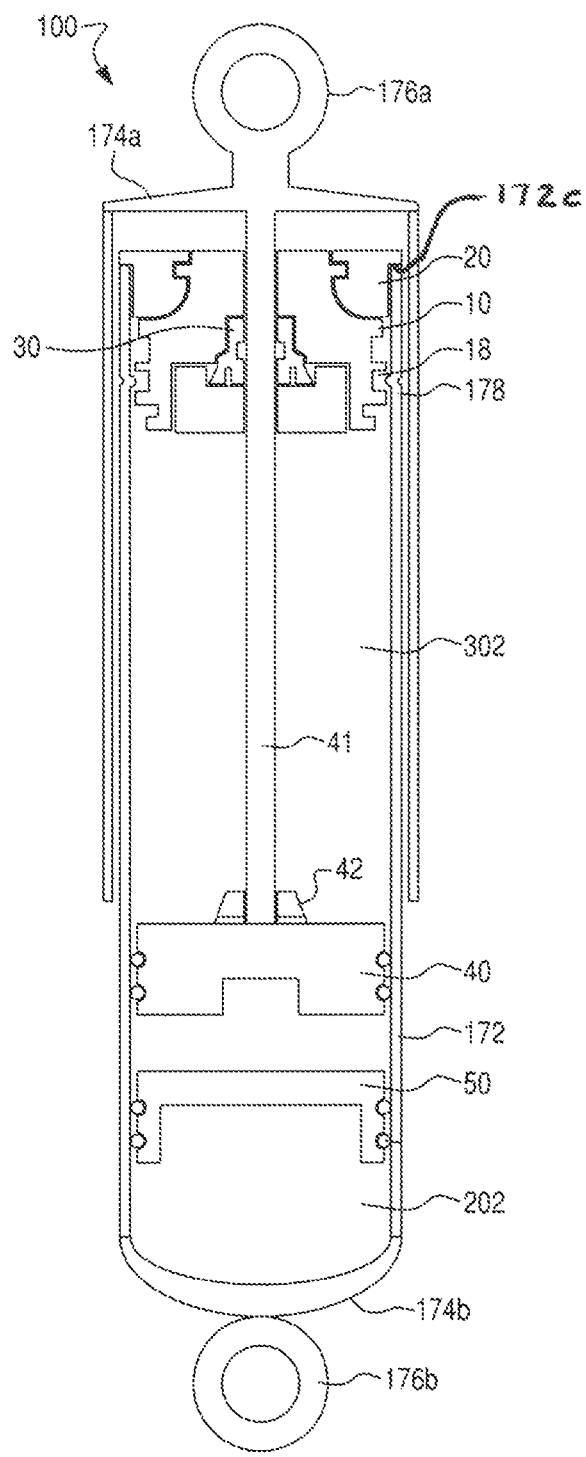
FIG. 1 is a cross-sectional view of an embodiment of a vehicle damper made in accordance with principles of the disclosed subject matter.
Figure 3:
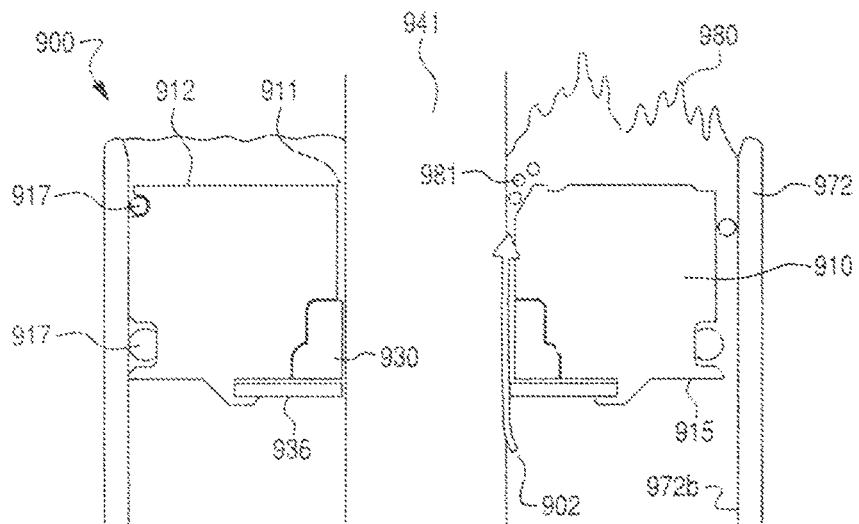
FIG. 3 is a cross sectional view of the conventional sealing system shown in FIG. 2A after deterioration.

FIG. 1 shows a cross section of a vehicle damper 100 that includes a tube 172 that encases both a working piston 40 and a floating piston 50. The working piston 40 is attached to a piston rod 41 by a lock mechanism 42. The floating piston 50 is located in the tube 172 below the working piston 40 and separates the working chamber hydraulic fluid 302 from a gas 202 located below the floating piston 50. A lower cap 174b encloses the lower end of the tube 172. A piston rod guide 10 encloses an upper portion of the tube 172 while allowing the piston rod 41 to slide therethrough.

An upper connector 176a can be provided in an upper cap 174a located at the upper portion of the tube 172 for connection to a vehicle frame (or vehicle suspension). Likewise, a lower connector 176b can be provided in the lower cap 174b located at the lower portion of the tube 172 for connection to a vehicle suspension (or vehicle frame).

The working chamber defined by the piston 40 floating piston 50 and damper tube 172 can be referred to as a working volume. Of course, if there is no floating piston 50, the working volume can be defined by the piston 40, damper tube 172 and a surface of the lower cap 174b (or other structure that contains the hydraulic fluid 302). Both the piston rod 41 and damper tube 172 have a longitudinal axis that can be coincident with each other. Typically, the working volume is located lower along the longitudinal axis of either the piston rod 41 or the damper tube 172 than are the rod guide 10, outer seal 20 or top surface 172c of the damper tube 172. The rod guide 10 can be locked to the damper tube 172 with respect to movement in the longitudinal axis direction by a clinch indent 178 in the tube 172 that mates with an indent 18 in a side of the piston rod guide 10.

FIG. 2B shows a detailed cross sectional view of the seal system for the vehicle damper 100 shown in FIG. 1. In particular, the rod guide 10 includes an upper outer annular rim 13 into which an upper outer seal 20 is fitted. The rod guide 10 can be made from various hard materials, including metals, ceramics, and even some plastics. For example, the rod guide 10 can be made from aluminium or steel. More specifically, the rod guide can be made from an aluminium type material that includes aluminium, aluminium alloys, anodized aluminium, and the like. Moreover, the aluminium type material can include surface treated aluminium, including aluminium that is anodized and then coated with Teflon or other protective coating.

The upper outer seal 20 can be made of a relatively softer more pliable material (as compared to the material of the rod guide 10 or the damper tube 172) for creating the seal between the rod guide 10 and the damper tube 172. For example, the upper outer seal 20 can be made from rubber, plastic, soft metals, ceramics, etc., including silicon, polyurethane, and other plastics and rubbers. In particular, the outer seal 20 can be made from a low conductivity rubber when used in a magneto-rheological damper or any damper with an aluminum guide and a steel tube. The low conductivity rubber is used to reduce the possibility of galvanic corrosion between the steel and aluminum.

The damper tube 172 can be made from hard materials similar to those from which the rod guide is constructed. Specifically, the damper tube can be made from the aluminium type materials as described above or from steel type materials including steel, steel alloys, galvanized steel, different phase steel materials, and the like.

The outer seal 20 can be configured (in conjunction with the structural configuration of the rod guide 10 and damper tube 172) to allow water and other debris to roll off of the top surface 12 of the rod guide 10. For example, the top surface 22 of the upper outer seal 20 can be located lower than the top surface 12 of the rod guide 10. In addition, an overhang portion 21 can be provided on the outer seal 20 that lies atop an upper rim or upper surface 172c of the damper tube 172 so that water and other debris cannot get in between the damper tube 172 and an outer side surface 24 of the outer seal 20. In addition, the configuration of the outer seal 20 can be slanted or otherwise configured to direct water away from the top surface 12 of the rod guide 10 so that little or no standing water is present on the top surface 12 of the rod guide 10. An indent can be provided on the inner surface 23 of the outer seal 20 that allows the seal 20 to easily lock with the upper outer annular rim 13 of the rod guide 10.

A lower inner seal 30 can be locked into an inner lower annular indent 16 in the rod guide 10 by a lock ring 36. The lower inner seal 30 is configured to seal the through hole 11 that exists in the space between the piston rod 41 and the rod guide 10. The inner seal 30 can be made from a relatively soft material, such as polyurethane and other types of rubbers or plastics, etc.

The damper 100 shown in FIG. 2B can be a typical damper, but can also be configured as a magneto-rheological damper in which the hydraulic fluid 302 includes magnetic material such that the viscosity of the hydraulic fluid 302 can be changed by applying an electric field to the fluid 302. For example, an electrical wire core can be provided within the piston rod 41 for producing an electrical field within the hydraulic fluid 302 to provide active control of the damping amount for the vehicle damper 100.

Figure 4:
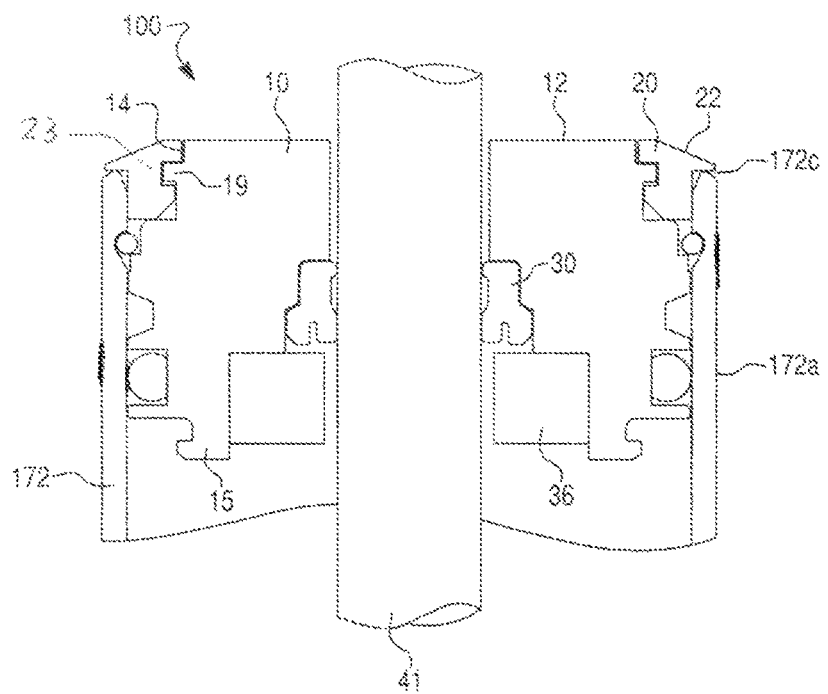
FIG. 4 is a cross sectional view of another embodiment of a sealing system for a vehicle damper made in accordance with principles of the disclosed subject matter.

FIG. 4 shows a cross-sectional view of another embodiment of a vehicle damper 100 with a seal system made in accordance with principles of the disclosed subject matter. In this embodiment, the outer seal 20 and rod guide 10 can be configured such that the outer seal 20 has a top surface 22 that is inclined from the top surface 12 of the rod guide 10. The top surface 22 of the outer seal 20 can terminate at a position corresponding to the outer surface 172a of the damper tube 172. Thus, water and debris travel downwards over the top surface 22 of the outer seal 20 and over the periphery of the rim/top surface 172c of the damper tube 172. In this embodiment, the rod guide 10 extends slightly above the annular rim/top surface 172c. The rod guide 10 can be provided with an extension knob 19 about the outer wall portion 14 that locks with an indent in the inner portion 23 of the outer seal 20.

Figure 5:
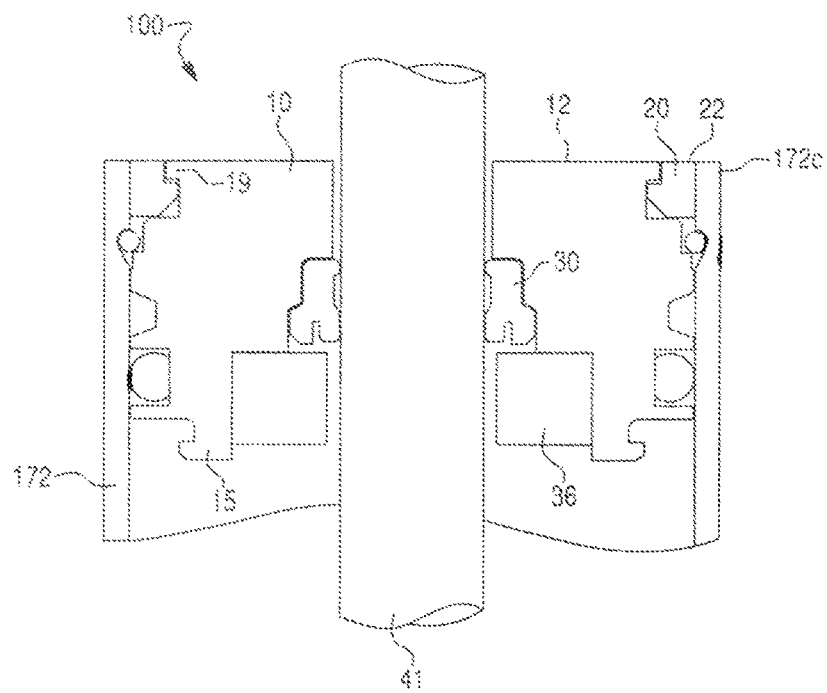
FIG. 5 is a cross sectional view of another embodiment of a sealing system for a vehicle damper made in accordance with principles of the disclosed subject matter.

FIG. 5 shows a cross-sectional view of another embodiment of a vehicle damper 100 with seal system made in accordance with principles of the disclosed subject matter. In this embodiment, the rod guide 10, outer seal 20, and the damper tube 172 can be configured such that the respective top surfaces (i.e., tops surface 12, top surface 22, and top surface of annular rim 172c) are substantially co-planar.

While there has been described what are at present considered to be exemplary embodiments of the invention, it will be understood that various modifications may be made thereto. For example, the outer seal 20 can be configured to extend across the entire top surface 12 of the rod guide 10 as well as the annular rim 172c of the tube 172 in order to seal the adjacent portions between the piston rod 41, rod guide 10, and tube 172. In addition, the manner for attaching each of the structures to each other can vary greatly without departing from the spirit and scope of the disclosed subject matter. For example, the knob 19 located at the outer wall surface 14 of the rod guide 10 can instead be configured as an indent that mates with a corresponding knob located on the outer seal 20. In addition, adhesives, lock rings, or other known attachment structures can be used to attach the upper outer seal 20 to the rod guide 10 and/or tube 172.

The inner seal 30 is shown as located at a lowermost surface 15 of the rod guide 10. However, other configurations of the inner seal 30 can be incorporated into a damper 100 of the disclosed subject matter. For example, the inner seal 30 can be provided in a central portion or at a top surface 12 of the rod guide 10. If provided at the top surface 12 of the rod guide 10, the inner seal 30 can be configured to drive water and debris away from the piston rod 41 and towards the outer portion of the damper tube 172. For example, the inner seal 30 can have an upper surface that is inclined downwards and away from the piston rod 41. Of course, other configurations of the upper surface of the inner seal 30 are contemplated and fall within the scope of the disclosed subject matter, even embodiments in which the inner seal 30 does not direct water or debris away from the piston rod 41.

The specific configurations of each of the damper structures can also vary without departing from the spirit and scope of the disclosed subject matter. For example, while the tube 172 can have a symmetrical cross-section when viewed along its longitudinal axis, it can also be non-symmetrical. Specifically, the tube can be circular, oval, square, polygonal or other similar symmetrical shape when viewed in cross-section along its longitudinal axis, or it can be non-uniform and non-symmetrical when viewed in cross-section along its longitudinal axis. Thus, the corresponding shape of the piston, rod guide, outer seal and other portions can also be shaped to correspond to the symmetrical or non-symmetrical tube cross section.

In addition, it should be understood that the invention is not only applicable to active, in-active and/or semi-active suspension dampers in a vehicle, but could also be applied to use in dampers such as trunk or hood air springs and other pneumatic or hydraulic cylinder devices used in a vehicle.

While there has been described what are at present considered to be exemplary embodiments of the invention, it will be understood that various modifications may be made thereto, and it is intended that the appended claims cover such modifications as fall within the true spirit and scope of the invention. Any conventional art document referenced above is/are hereby incorporated by reference in its entirety.

What is claimed is:

1. A vehicle damper, comprising:
   a damper tube having a first portion and a second portion located along a longitudinal axis of the damper tube;
   a piston located in the damper tube;
   a piston rod attached to the piston at the first portion of the damper tube and extending from the first portion of the damper tube to the second portion of the damper tube along the longitudinal axis of the damper tube;
   a rod guide located adjacent the piston rod and the second portion of the damper tube and made from a hard material;
   a working volume defined by the damper tube; and
   an outer seal located between the rod guide and the damper tube and made from a relatively softer material than the rod guide, wherein
   the outer seal includes an outer seal top surface that faces away from the working volume, the rod guide includes a rod guide top surface that faces away from the working volume, and the damper tube includes a damper tube top surface that faces away from the working volume,
   the working volume is located at a first longitudinal axis position with respect to a longitudinal axis direction, the rod guide top surface is located at a second longitudinal axis position with respect to the longitudinal axis direction, the outer seal top surface is located at a third longitudinal axis position with respect to the longitudinal axis direction, the damper tube top surface is located at a fourth longitudinal axis position with respect to the longitudinal axis direction,
   the second longitudinal axis position of the rod guide top surface is spaced from the first longitudinal axis position of the working chamber at a rod guide longitudinal axis distance, the third longitudinal axis position of the outer seal top surface is spaced from the first longitudinal axis position of the working chamber at an outer seal longitudinal axis distance, the fourth longitudinal axis position of the damper tube top surface is spaced from the first longitudinal axis position of the working chamber at a tube top longitudinal axis distance,
   the tube top longitudinal axis distance is less than or substantially equal to the rod guide longitudinal axis distance,
   the outer seal further includes a main portion and an overhang portion cantilevered to the main portion, the overhang portion extending away from the longitudinal axis across the damper tube top surface and engaging the damper tube top surface, and
   the rod guide has a guide maximum width and the outer seal has a seal maximum width that is greater than the guide maximum width, where the respective maximum width is measured from the longitudinal axis of the damper tube to a farthest point of the respective one of the rod guide and the outer seal in a direction perpendicular to the longitudinal axis such that the outer seal is spaced from the piston rod along the extent of the outer seal, where the extent of the outer seal is measured in a direction substantially parallel with the longitudinal axis of the damper tube.

2. The vehicle damper of claim 1, wherein the outer seal longitudinal axis distance is less than or substantially equal to the rod guide longitudinal axis distance.

3. The vehicle damper of claim 1, wherein the rod guide top surface, the outer seal top surface, and the top surface of the damper tube are configured to cause liquid to continuously move away from the rod guide and towards the damper tube when the vehicle damper is in use.

4. The vehicle damper of claim 1, wherein the rod guide is made from an aluminum material and the damper tube is made from a steel material.

5. The vehicle damper of claim 1, wherein the outer seal top surface is substantially co-planar with the rod guide top surface.

6. The vehicle damper of claim 1, wherein the rod guide is located at an upper portion of the vehicle damper and the piston is located at a lower portion of the vehicle damper, and an imaginary line that extends perpendicular to the piston rod and is in contact with an uppermost portion of the rod guide top surface does not intersect the damper tube.

7. The vehicle damper of claim 1, wherein the rod guide is located at an upper portion of the vehicle damper and the piston is located at a lower portion of the vehicle damper, and an imaginary line that extends perpendicular to the piston rod and is in contact with an uppermost portion of the outer seal top surface does not intersect the damper tube.

8. The vehicle damper of claim 1, wherein the vehicle damper is a monotube vehicle damper.

9. The vehicle damper of claim 1, wherein the vehicle damper is a magneto-rheological vehicle damper.

10. The vehicle damper of claim 1, wherein the outer seal top surface is inclined downward and away from the piston rod with respect to a direction perpendicular to the longitudinal axis of the damper tube.

11. The vehicle damper of claim 1, wherein the outer seal top surface extends along the main portion and the overhang portion.

12. A vehicle damper, comprising:
a piston rod having a longitudinal axis extending between an upper portion of the piston rod and a lower portion of the piston rod;
a piston attached to the lower portion of the piston rod;
a rod guide located adjacent the upper portion of the piston rod and having a top surface located at an uppermost portion of the rod guide, the rod guide made from a first material selected from the group consisting of aluminum material and steel material;
a damper tube located adjacent the piston rod and extending from the upper portion to the lower portion of the piston rod, the damper tube having a top surface at an uppermost portion of the damper tube, and the top surface of the damper tube is located substantially co-planar with or lower than the rod guide top surface, the damper tube being made from a second material selected from the group consisting of aluminum material and steel material, and the second material of the damper tube being different from the first material of the rod guide; and
an outer seal made of a material that is softer than the first material of the rod guide, the outer seal located between the rod guide and the damper tube and including an outer seal top surface at an uppermost portion of the outer seal such that at least the rod guide top surface and the outer seal top surface cooperate with each other to form an upper surface of the vehicle damper, wherein
a lowest surface portion of the upper surface of the vehicle damper is located at a maximum distance of the extent of the damper tube as measured in a direction substantially perpendicular to the longitudinal axis of the piston rod, and
the rod guide is positioned intermediate the outer seal and the piston rod such that the outer seal is spaced from the piston rod along the extent of the outer seal, where the extent of the outer seal is measured in a direction substantially parallel with the longitudinal axis of the piston rod.

13. The vehicle damper of claim 12, wherein a portion of the upper surface of the vehicle damper that is furthest away from the piston rod is lower than a portion of the upper surface of the vehicle damper that is closest to the piston rod.

14. The vehicle damper of claim 12, wherein the rod guide top surface, the outer seal top surface, and the top surface of the damper tube are configured to cause liquid to continuously move away from the rod guide and towards the damper tube when the vehicle damper is in use.

15. The vehicle damper of claim 12, wherein the damper tube is made from a steel material.

16. The vehicle damper of claim 12, wherein the outer seal includes an overhang portion that extends beyond an inner surface of the damper tube in a direction substantially perpendicular to the longitudinal axis of the piston rod.

17. The vehicle damper of claim 12, wherein the outer seal top surface is substantially co-planar with the rod guide top surface.

18. The vehicle damper of claim 12, wherein an imaginary line that extends perpendicular to the longitudinal axis of the piston rod and is in contact with an uppermost portion of the rod guide top surface does not intersect the damper tube.

19. The vehicle damper of claim 12, wherein an imaginary line that extends perpendicular to the longitudinal axis of the piston rod and is in contact with an uppermost portion of the outer seal top surface does not intersect the damper tube.

20. The vehicle damper of claim 12, wherein the vehicle damper is a monotube vehicle damper.

21. The vehicle damper of claim 12, wherein the vehicle damper is a magneto-rheological vehicle damper.

* * * * *